Figure 1:
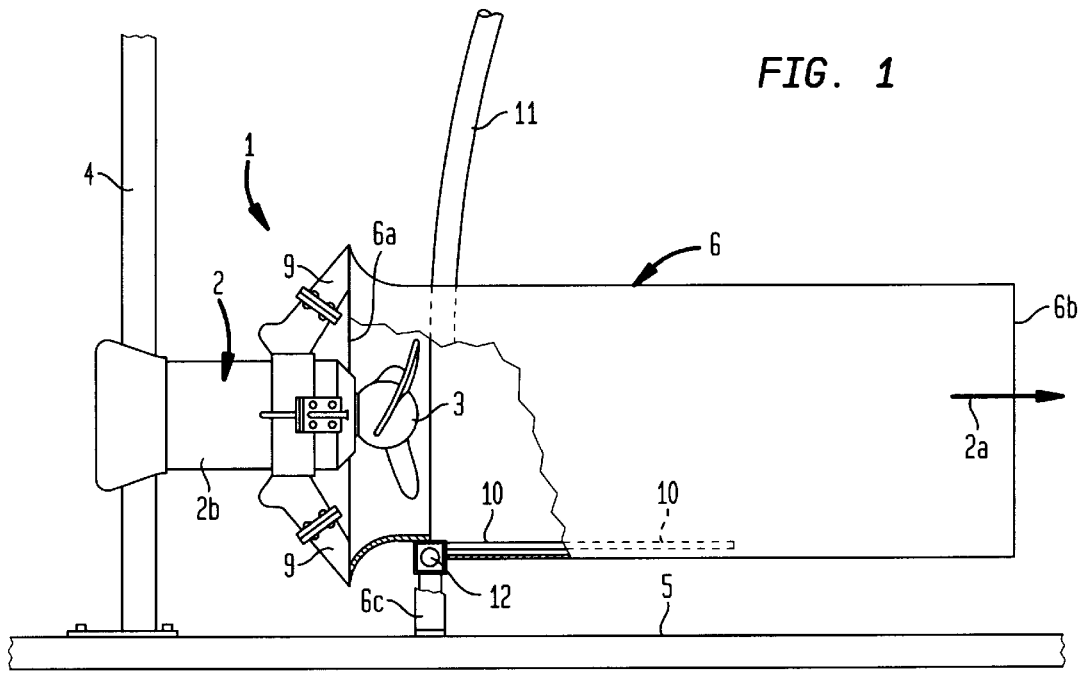

United States Patent
Lisi

[19]
[11] Patent Number: 6,076,812
[45] Date of Patent: *Jun. 20, 2000

[54] MIXING AND AERATION UNIT

[75] Inventor: Arnaldo Lisi, Arese MI, Italy

[73] Assignee: ITT Manufacturing Enterprises, Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/970,863

[22] Filed: Nov. 14, 1997

[30] Foreign Application Priority Data

Nov. 20, 1996 [IT] Italy .................................. MI96A2501

[51] Int. Cl.⁷ ...................................................... B01F 3/04
[52] U.S. Cl. ............................ 261/92; 261/93; 261/122.1
[58] Field of Search .............................. 361/28, 36.1, 37, 361/77, 84, 93, 92, 122.1, 29

[56] References Cited

U.S. PATENT DOCUMENTS

| | | | |
|---|---|---|---|
| 2,772,863 | 12/1956 | Harney et al. | 261/93 |
| 3,643,403 | 2/1972 | Speece | 261/93 |
| 3,671,022 | 6/1972 | Laird et al. | 361/93 |
| 3,865,721 | 2/1975 | Kaelin | 361/93 |
| 4,431,597 | 2/1984 | Cramer et al. | 261/93 |
| 4,512,936 | 4/1985 | Oshima et al. | 261/93 |
| 4,514,343 | 4/1985 | Cramer et al. | 261/93 |
| 4,581,182 | 4/1986 | Cramer et al. | 261/93 |
| 4,710,325 | 12/1987 | Cramer et al. | 261/93 |

FOREIGN PATENT DOCUMENTS 756252 3/1971 Belgium .................................. 261/93

*Primary Examiner*—C. Scott Bushey
*Attorney, Agent, or Firm*—Menotti J. Lombardi

[57] ABSTRACT

The invention concerns a mixing and aeration unit, especially for waste water treatment and including a submersible axial flow mixer (2), an elongated jet ring (6) with inlet (6a) adjacent the mixer propeller (3) and housing a number of air bubble diffusers (10).

17 Claims, 3 Drawing Sheets

MIXING AND AERATION UNIT

The invention concerns a mixing and aeration unit, especially for treatment of waste water, and comprising a submersible axial flow mixer provided with air diffusers, said diffuser being fed from a compressor.

It is common knowledge that efficient machines are necessary to increase the oxygen quantity dissolved in water during certain processes and also to minimize the energy demand. This is valid for waste water treatment installations, fish breeding plants etc. It is also an advantage to be able to monitor the quantity of introduced oxygen and change it in dependence of changes in the industrial processes.

In order to obtain a high oxygen transfer efficiency, it is usual to introduce compressed air in the form of small bubbles with diameters preferably between 0.1 and 0.3 mm. The bubbles are introduced by diffusers positioned over a wide area of the tank bottom said diffusers may consist of flexible foam plastic porous pipes, porous ceramic disks, or microdrilled elastomer membranes. The introduced air flows vary from 2 to 50 $m^3/h$ every $m^2$ of the tank bottom, the transfer efficiencies being high at low flows and lower at high flows.

In order to further improve the quantity of the dissolved oxygen in the water with regard to the dimensions of the air bubbles as well as their staying time in the water, it is possible to attach said diffusers to submersible mixers provided with impellers which obtain axial flows over the diffusers. In this way the staying time becomes longer and the air/water exchange is increased.

The above mentioned techniques have however some disadvantages. The holes in the air diffusers being very small must be checked frequently as the risk for clogging is great. To make these checks without emptying the tank is costly. In addition, emptying of the tank will be necessary when replacing a clogged diffuser or a pipe.

To empty a tank means additional problems as the law normally prohibits pumping out untreated waste water. Thus a spare tank is needed to take care of such water.

A further disadvantage is that the costs of a plant will be very high as the mixers and the diffusers must be spread over a large bottom area in order to obtain a good result. This will also increase the costs for the required land area.

Still another well-known technique is to use diffusers having diameters up to 8–10 mm which certainly diminishes the risk of clogging and thus the need for maintenance. However the efficiency is very low for this type of equipment which means a very high energy demand.

The purpose of this invention is thus to obtain a mixing and aeration unit which shall overcome the above mentioned disadvantages. The most important purpose is to obtain a mixing and aeration unit being able to considerably increase the introduced air flows into the liquid and to obtain a good oxygen transfer efficiency thus avoiding covering of large bottom areas of a tank with air diffusers.

Another important purpose is to obtain a combined mixing and aeration unit with reduced dimensions an d a limited weight to allow an easy installation and an easy possibility to remove it from the tank bottom for inspection and maintenance.

Still another purpose is to obtain a combined mixing and aeration unit which, in addition to high oxygen transfer efficiency, is equipped with non-clogging diffusers which decreases maintenance intervals.

The above mentioned purposes are obtained by help of the invention as stated in the enclosed patent claims. According to the invention the combined mixing and aeration unit comprises an elongated jet ring with an air inlet close to the mixer and an outlet spaced from the inlet in order to channel the axial flow produced by the mixer, the air diffusers being positioned inside said jet ring.

Figure 2:
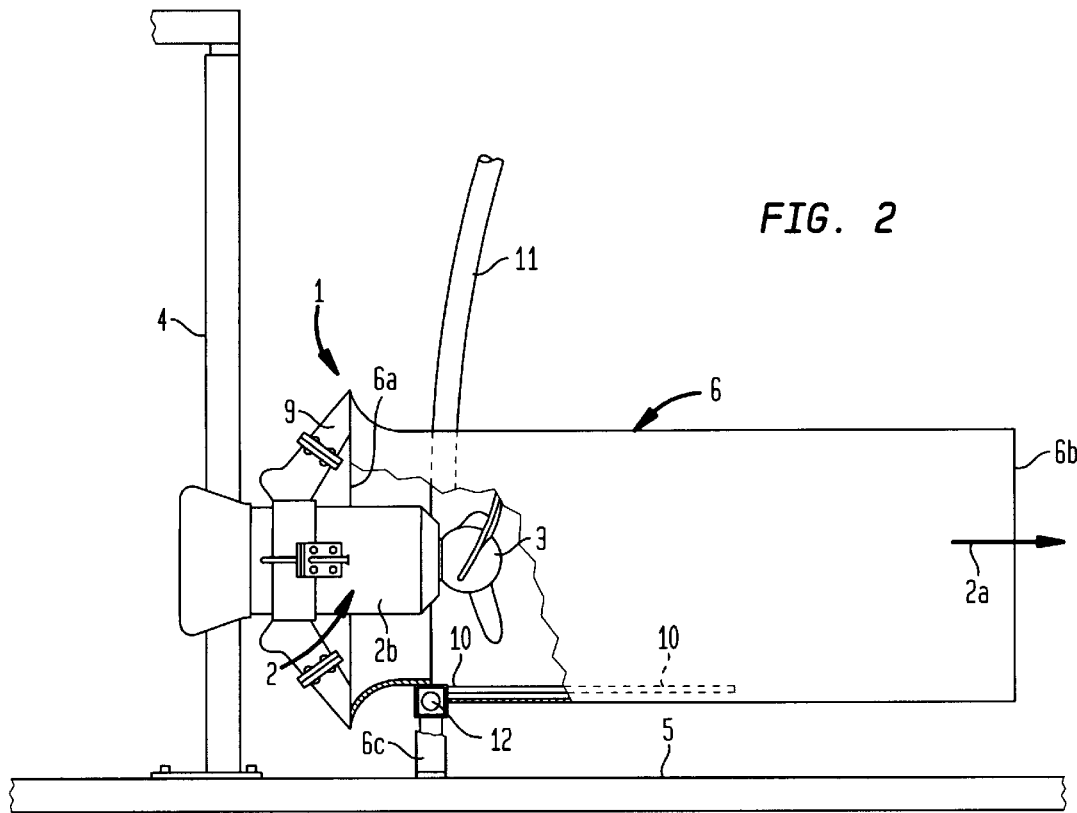
Figure 3:
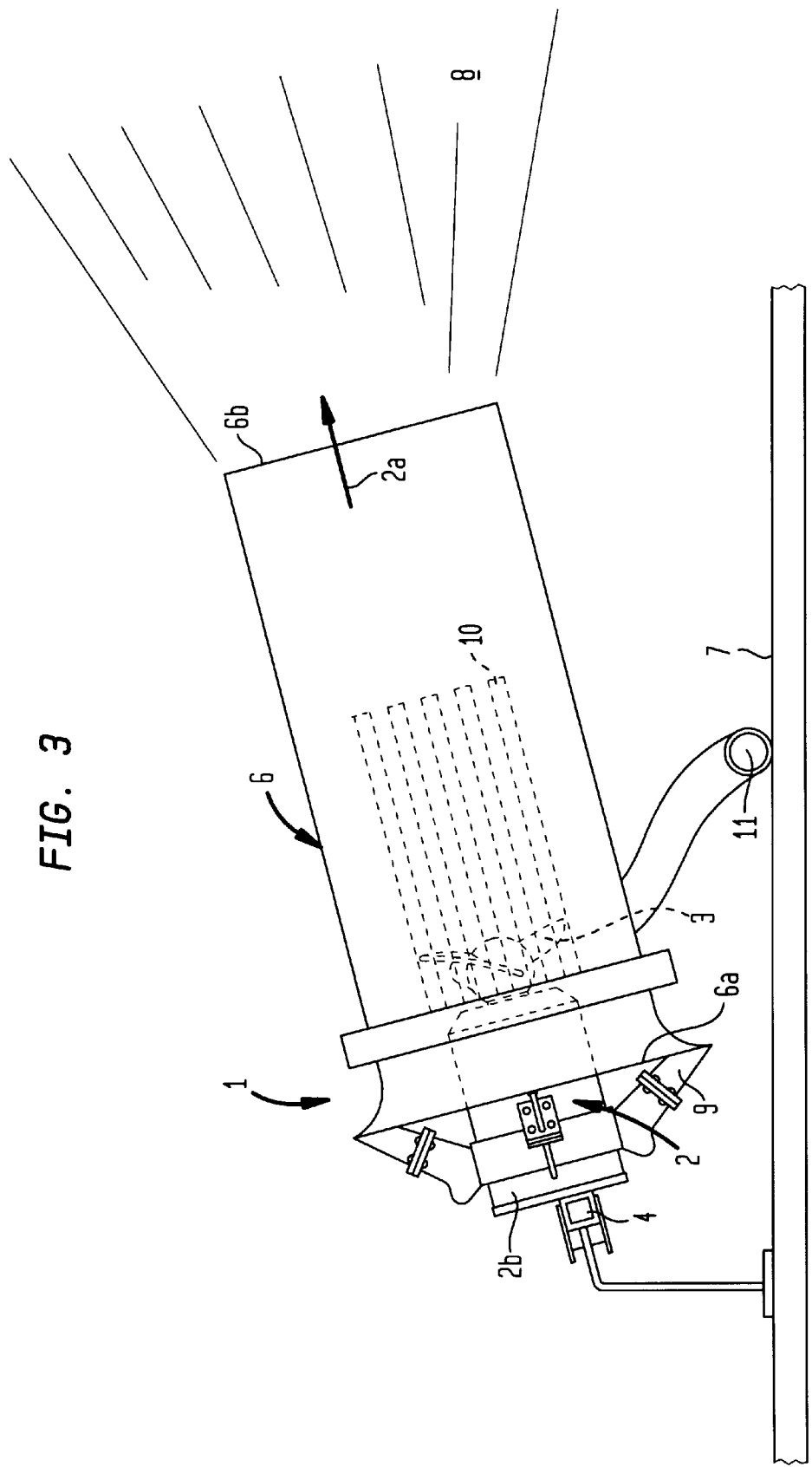
Figure 4:
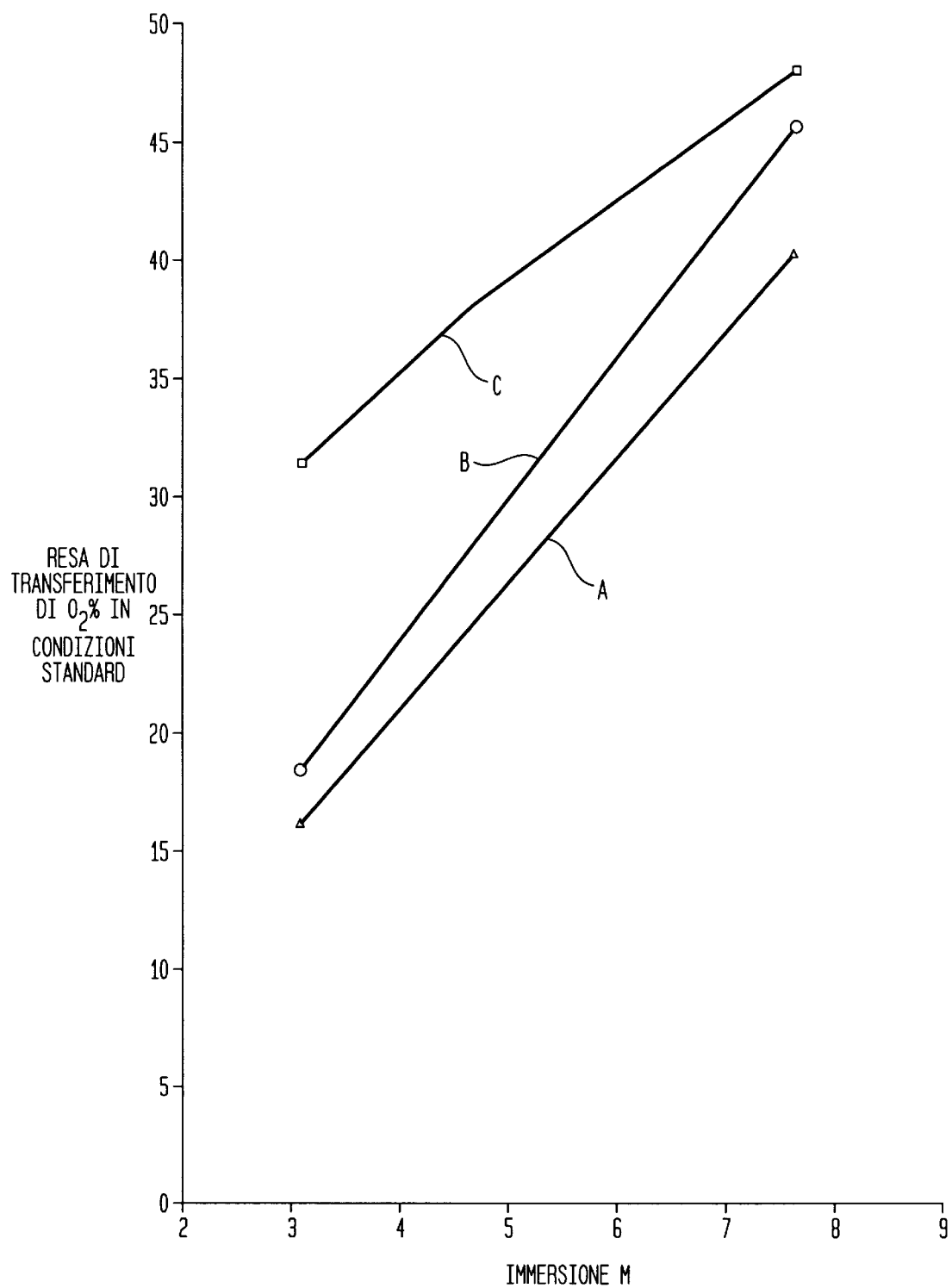

A preferred embodiment as shown in the enclosed drawings where:

FIG. 1 shows a high side view of the unit according to the invention in a first operating position, FIG. 2 shows the same unit in a second operating position, FIG. 3 shows a view of the unit from above, FIG. 4 shows a diagram where the oxygen transfer efficiency of the unit according to the invention is compared with corresponding efficiencies obtained with known technique.

In the drawings the mixer and aeration unit is generally given the reference No. 1. Said unit comprises a mixer 2 which produces a flow along an axial direction 2 a by help of a propeller 3. The mixer is slidably attached to a vertical bracket 4 fixed to the tank bottom 5.

A jet ring 6 is coupled to the mixer 2 with its inlet 6a close to the mixer and its outlet 6b spaced from said inlet. The jet ring 6 has a cylindrical shape and channels the axial flow produced by the propeller 3. The mixer 2 and the jet ring 6 are arranged horizontally and with an angle relative the vertical wall 7 of the tank which increases the mixing.

The jet ring 6 is supported by a foot 6c and by connection parts 9 positioned close to the inlet 6a and slidably attached to the mixer housing 2b. The jet ring 6 may be adjusted in such a way that the propeller 3 can be located adjacent the inlet 6a (FIG. 1) and in different positions further into the jet ring, (FIG. 2).

Tubular air diffusers 10 are arranged within the jet ring 6 close to the bottom and the inlet 6a. The holes in the tubes have dimensions between 4 and 10 mm. The diffusers obtain compressed air from a not shown compressor through a pipe 11 connected to a manifold 12 for the diffusers 10.

The unit according to the invention operates in the following way:

Water lacking oxygen is taken up from the bottom 5 of a tank where the unit 1 is immersed by the propeller 3 and is given a speed of about 1.5 to 4.5 m/sec. into the jet ring 6 where its turbulence is increased. Big air bubbles emerging from the diffusers 10 within the jet ring 6 get into contact with the turbulent flow which divides them into smaller bubbles. The dissolution of the oxygen into the liquid is almost completely obtained inside the jet ring and the jet 8 is diffused into the water mass with the oxygen saturated.

The volume ratio between the water flow sent from the mixer into the jet ring and the air introduced by the diffusers may vary between five and ten times. Tests have shown that the oxygen transfer efficiency is between 5 and 20% lower than the value obtainable by mixers provided with fine bubble diffusers at an immersion of about 7 m.

By changing the position of the jet ring 6 relative to the propeller 3, it is possible to modify the oxygen transfer efficiency. In FIG. 4 the oxygen percentage transfer efficiency curve relative the immersion depth is shown. It symbolizes the values when the propeller is positioned close to the inlet 6 a, FIG. 1, while B symbolizes the values when the propeller takes the position shown in FIG. 2. C concerns the corresponding values for a fine bubble diffuser. As the strong turbulence and the high speed within the jet ring are very effective in dividing the big bubbles fed by the diffusers into small bubbles, it is possible to use diffusers having openings that are 20–500 times bigger than the ones normally used. In practice, not only the slightly lower oxygen transfer efficiency is fully compensated, but also the diffuser area can be reduced, meaning that the mixer-and aeration unit can be designed very compact.

Tests have shown that the ratio between oxygen transfer capacity in waste water and in clean water is between 0.9 and 1 when using the new unit, while the same ratio when using the previous mentioned aerating systems lies between 0.3 and 0.75. Thus the strong turbulence in the new unit makes the result less sensitive regarding purification such as sludge and suspended objects.

The advantages obtained by the unit according to the invention could be summarized as following:

The mixing and aeration unit avoids distribution of compressed air diffusers on the whole or a part of the tank bottom.

The unit is very compact and the possibility to install it near the tank wall makes it easy to remove for inspection and maintenance without emptying the tank.

It is possible to use big bubble diffusers which decrease clogging problems and makes longer operation times possible.

It is finally possible to adjust the air flow without changing the mixing efficiency. It is in fact possible to decrease the air flow down to zero to obtain denitrification/nitrification alternating cycles which are often requested in modern waste water treatment.

I claim:

1. A mixing- and aeration unit comprising: a submersible axial flow mixer, a number of air bubble diffusers and an air feeding compressor, wherein a mixer is connected to an elongated jet ring, an inlet of the jet ring being adjacent a mixer propeller and that the air bubble diffusers are positioned within the jet ring, wherein each of said air bubble diffusers comprises a tubular member, and each of said tubular members is positioned substantially parallel to a central axis of said jet ring.

2. A mixing- and aeration unit according to claim 1, wherein each of said tubular elements includes a plurality of apertures each being suitable for producing bubbles.

3. A mixing- and aeration unit according to claim 1, wherein the air bubble diffusers are integrated with the jet ring and positioned near its inlet.

4. A mixing- and aerating unit according to claim 1, wherein air bubble diffusers are positioned in a lower part of the jet ring.

5. A mixing- and aeration unit according to claim 1, wherein the mixer propeller, which is positioned within the jet ring, can be adjusted between different positions relative the inlet of the jet ring.

6. A mixing- and aerating unit according to claim 1, wherein the jet ring has a cylindrical shape.

7. A mixing- and aeration unit comprising:

an elongated jet ring having an longitudinal axis and including an inlet;

a mixer including a mixer propellor and connected to said elongated jet ring such that said mixer propellor is positioned within said jet ring, adjacent to said inlet, and adjustable between different positions relative said inlet; and, a plurality of tubular shaped air bubble diffusers positioned in said jet ring in a manner substantially parallel to said longitudinal axis of said jet ring.

8. The mixing- and aeration unit of claim 7, wherein each of said air bubble diffusers comprises at least one aperture adapted for producing bubbles.

9. The mixing- and aeration unit of claim 7, wherein each said air bubble diffuser is integrated with the jet ring and positioned near said inlet.

10. The mixing- and aeration unit of claim 7, wherein each said air bubble diffuser is positioned in a lower part of the jet ring.

11. The mixing- and aeration unit of claim 7, wherein the jet ring has a cylindrical shape.

12. A mixing- and aeration unit comprising:

an elongated jet ring having a central axis and including an inlet;

a mixer including a mixer propellor and connected to said elongated jet ring such that said mixer propellor is positioned within said jet ring and adjacent to said inlet; and, a plurality of substantially tubular air bubble diffusers each integrated with the jet ring and positioned near said inlet such that each of said air bubble diffusers is substantially parallel to said central axis of said jet ring.

13. The mixing- and aeration unit of claim 12, wherein each said air bubble diffuser comprises at least one aperture adapted for producing bubbles.

14. The mixing- and aeration unit of claim 12, wherein each said air bubble diffuser is positioned in a lower part of the jet ring.

15. The mixing- and aeration unit of claim 12, wherein the jet ring has a cylindrical shape.

16. The mixing- and aeration unit of claim 12, wherein the mixer propeller is positioned within the jet ring and can be adjusted between different positions relative said inlet of the jet ring.

17. The unit of claim 12, wherein said unit is adapted to be submerged horizontally within a tank for operation.

* * * * *